Figure 1:
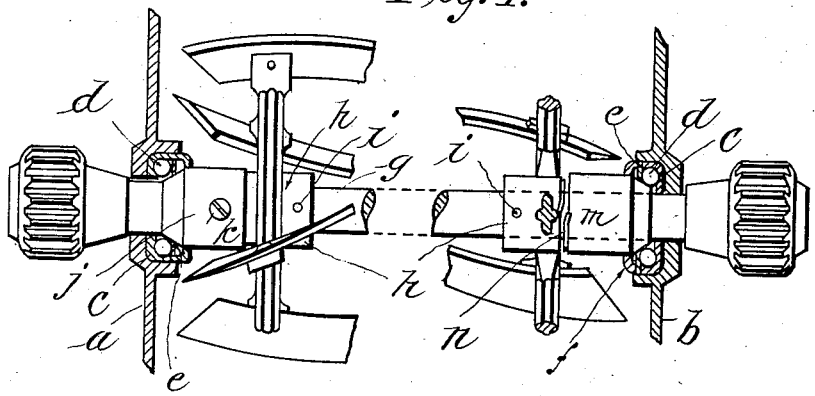

No. 894,367. PATENTED JULY 28, 1908.
A. B. CASE.
BALL BEARING ADJUSTMENT FOR LAWN MOWERS.
APPLICATION FILED JAN. 31, 1907.

Witnesses:
H. L. Sprague
H. W. Bown

Inventor:
Adelbert B. Case
by Chapin & Heo
Attorneys.

UNITED STATES PATENT OFFICE.

ADELBERT B. CASE, OF SPRINGFIELD, MASSACHUSETTS.

BALL-BEARING ADJUSTMENT FOR LAWN-MOWERS.

No. 894,367.      Specification of Letters Patent.      Patented July 28, 1908.

Application filed January 31, 1907. Serial No. 355,009.

*To all whom it may concern:*

Be it known that I, ADELBERT B. CASE, a citizen of the United States of America, residing at Springfield, in the county of Hampden and State of Massachusetts, have invented new and useful Improvements in Ball-Bearing Adjustments for Lawn-Mowers, of which the following is a specification.

This invention relates to ball bearings as applied to lawn mowers and has especial reference to an entirely new method of adjusting automatically the ball-bearing journals of the cutter-shaft so that in case of any change of position of the frame-parts the ball-bearing cones on the cutter-shaft will always maintain the proper pressure on the balls.

The particular object of this invention is to provide such automatic adjustment of the ball-bearings in relation to the cutter-shaft as will entirely dispense with any attention to these bearings on the part of the operator of the mower after the assembling of the mower at the factory.

The application of ball bearings to the cutter-shaft of lawn mowers has become quite general in the last ten years, and while they have proved fairly efficient in many cases, it has been found that they are not entirely satisfactory for the reason that no efficient means has been provided for automatically adjusting the ball-bearing cones on the cutter-shaft. All of the means of adjustment heretofore in use have been strictly mechanical and rigidly secured both of the ball-bearing cones to the cutter-shaft, and, after the adjustment had been made at the factory or afterwards, no means were provided for automatically changing this adjustment, in accordance with the changed position of the parts of the frame in which the cutter-shaft was mounted.

The present construction of ball-bearings in lawn mowers in general, consists of two side plates or frames in which are mounted the hardened cases or ball-races, and with two cones that are fixedly secured to the cutter-shaft when the machine is assembled. One of these cones is generally provided with some mechanical means of adjustment whereby it may be moved on the cutter-shaft in the line of the axis thereof, thus securing the proper engagement of the beveled portion of the cone with the balls in the side plate, and after the adjustment is effected securely locking this cone to the cutter-shaft. The common methods by which one of the cones can be adjusted to the balls and locked to the cutter-shaft are to cut a thread in the hole of the cone and also cut a thread on the cutter-shaft on which the cone is screwed, and when the proper adjustment has been effected to fasten the cone immovably to the cutter-shaft by means of a lock-nut and jam-washer, or by means of a set-screw passed through the cone and seating on the cutter-shaft, or by means of a set-screw pressing against the inner end of the adjusting cone. In all of these instances, no matter what means of adjusting the cone is employed after adjustment, the cone is fastened rigidly to the cutter-shaft. All of these methods of adjustment have been found, in actual practice, to develop serious faults, as the frame of the mower, (no matter how rigidly or well constructed since the same is made of light castings and braces,) is liable to warp and change the adjusted position of the bearings when the mower is in use. All of these alterations of the frame, no matter how slight, affect the ball bearings of the cutter-shaft with the usual result of loosening said bearings thus causing lost motion in the same and consequent inefficient working of the cutting edges of the mower, allowing the revolving knives to wear unevenly or out of true, thus destroying the edge and alinement of the stationary knife. In order to obviate all of these various defects which have been mentioned above, I have devised and thoroughly tested what I term an "automatic self-adjusting cone" on one end of the cutter-shaft of the lawn-mower.

By the use of my present device, the adjusting cone is never rigidly secured to the cutter-shaft to the extent of being immovable when in use, but is always free to slide axially of the shaft and produce at all times the proper amount of pressure on the balls in the side frame, and will not at the same time permit the cutter-shaft to rotate in the hole of the adjusting cone.

Broadly stated, the invention consists in placing on one end of the cutter-shaft an axially movable cone that is normally pressed outward towards the end of the shaft and towards the ball-bearing by means of a compensating spring which I term the "adjusting" end of the cutter-shaft. This compensating spring is preferably composed of a single turn of a spiral, and is preferably placed with one end against the cutter hub and its other end against the inward end of the movable cone, it being understood that the cutter-hub is securely fastened to the cutter-shaft. The end of the cutter-shaft opposite the "adjusting" end is provided with a ball-bearing cone that is permanently fixed thereto in the ordinary way. When assembled, the two ball-bearing cones are forced against the ball-bearings in each side plate of the mower, the tempered spiral compensating spring at the "adjusting" end of the cutter-shaft being compressed to nearly its own thickness. While I have found that the pressure exerted at the ends of this compensating spring against the adjacent inner ends of the movable cone and the cutter-hub (which is fastened to the cutter-shaft,) may be sufficient to prevent the cone from turning on the shaft when in use, I prefer to make a positively locking means between the ends of the compensating spring and the end surfaces of the adjusting cone, and cutter-hub as will be described in detail. The resulting action of this construction is that the lawn-mower cutter-shaft becomes entirely self-adjusting in its ball-bearings, and any change in the shape or adjustment of the frame, or position of its parts is instantly compensated for in the ball-bearings by means of the compensating spring causing the movable adjusting cone on the cutter-shaft to adapt itself to the new position by sliding either outward or inward on the shaft, and at the same time preventing the cutter-shaft from rotating in the ball-bearing cone.

It is understood that my improvement is not limited to one end only of the cutter-shaft but may be applied to either end, as will be described.

Various forms and modifications will be fully described in detail in the body of the specification.

Figure 2:
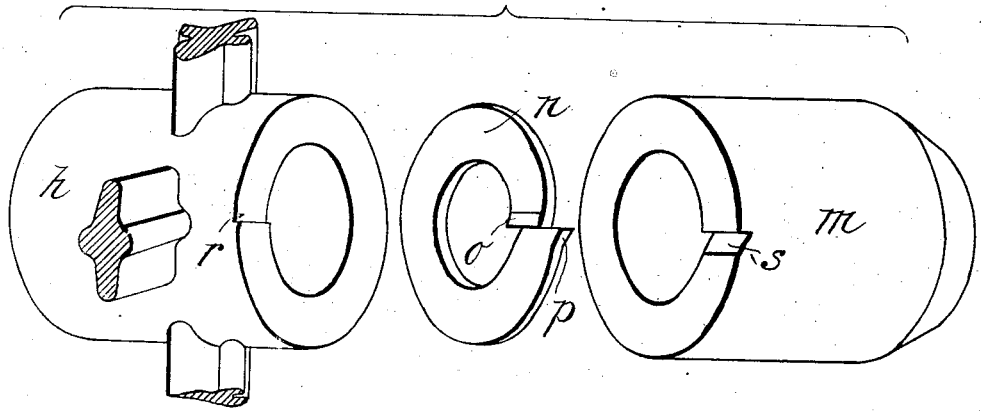
Figure 3:
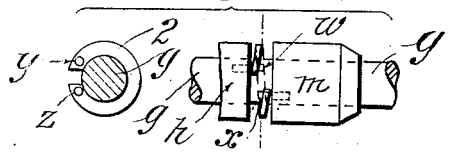

In the drawings forming part of this application—Figure 1 shows the assembled parts of the lawn mower with particular reference to the cutter-shaft and ball-bearing construction, and including the preferred form of compensating spring and means for locking the same to the cutter-hub and adjusting cone, the side portions of the frame being in section. Fig. 2 is an enlarged detail view of my preferred construction showing the parts before assembling. Fig. 3 is another modification showing in side and sectional elevation the assembled means for positively connecting the ends of the spiral compensating spring to both the cutter-head and the adjusting cone.

Referring to these drawings in detail, $a$ and $b$ designate the usual side plates of the frame of a lawn-mower which are provided with the usual hardened ball-races or cups $c$ in which are mounted the balls $d$ that are retained in the ball-races or cups by means of the usual plate $e$ and cap $f$.

The cutter-shaft is designated at $g$ on which are secured the usual cutter-hubs $h$ which are securely pinned to the shaft by means of the pins indicated at $i$.

$j$ designates the usual ball-bearing cone that is fixed to one end of the cutter-shaft by means of the set screw $k$ while the ball-bearing cone $m$ at the opposite end of the cutter-shaft is movably mounted thereon and provided with a compensating spiral adjusting spring $n$ located between the fixed cutter-hub $h$ and the movably mounted cone $m$. This spring loosely engages the cutter-shaft $g$, and is provided with oppositely extending spurs or sharp points $o$ and $p$ for engaging correspondingly shaped notches or recesses $r$ and $s$ in the cutter-hub and cone respectively. The compensating spring is hardened and tempered to spring temper.

In assembling the cutter-shaft and cylinder or wiper in the frame of the machine, the cone $m$ is placed under pressure thus forcing the oppositely facing ends of the compensating adjusting spring $n$ towards each other so that this spring will stand in practically the same plane; and, by reason of its expansive force, will always move the adjusting cone $m$ outward, thus taking up any lost motion between the ball-bearings and the cones.

It will be noticed that the adjusting spring is left-handed when used on the right-hand end of the shaft, and that a right-handed spring would be used on the left-hand end of the shaft, so that when the lawn mower is in use the rotary movement of the cutter-hub is transmitted through the compensating spring to the movable cone thus locking the cone to the cutter-shaft so that the same will always turn with the cutter-shaft which is an important point of my invention.

In the backward movement of the lawn mower, the cutter-shaft is not revolved on account of the usual clutch construction in the driving-gears and therefore needs no explanation here.

The adjusting spring which is located between the cutter-hub and the cone has the effect, when the mower is moving forward, of expanding so that the cone is moved or thrust outward towards the ball-bearing and when the mower is reversed so that the pressure on the ends of the adjusting spring is lessened thus causing the spring to slightly relax or contract, the pressure on the ball-bearing will be partially withdrawn. The expansion of the spring is caused, as readily understood, by the cutter-hub exerting a pressure on the end of the spring causing the same to expand or elongate.

The construction just described is my preferred form for locking the adjusting cone to the cutter-shaft so that it always revolves with the shaft and at the same time permits axial movement of the cone thereon thus compensating for any lost motion that may occur in the ball-bearing construction by reason of the inevitable warping or twisting of the framework of the lawn mower which is found in practice.

Referring to the construction shown in Fig. 3, $w$ and $x$ designate short pins that are secured in the cutter-hub and adjusting cone respectively.

$y$ and $z$ designate holes drilled in the ends of the compensating spiral adjusting spring 2 for receiving the pins $w$ and $x$; the assembled arrangement being clearly shown in this figure. This construction positively locks the movable cone to the cutter-shaft so that there will be no relative rotary movement between the two, and at the same time the compensating spring 2, by reason of its expansive force, will move the cone $m$ axially of the shaft in order to automatically take up any lost motion between the same and the ball-bearings in the side frames of the lawn mower should the relative arrangement of the frame construction become in any way displaced.

It will be seen that by means of the constructions described above I have produced an efficient and simple automatic compensating structure that will thoroughly overcome any of the defects heretofore inherent in ball-bearing cutter-shafts of a lawn mower.

This invention is applied to automatic adjustable cones as applied to double geared lawn-mowers, that is to say, those driven from each end of the cutter-shaft.

What I claim, is:—

As an improvement in compensating means for ball-bearings, a rotative element, a stop thereon, a cone longitudinally movable thereon, an elastic element located between the stop and cone, said elastic element comprising a compression spring, the spring being provided with means for locking the same to the stop and cone, whereby the cone is driven by the rotative element, as described.

ADELBERT B. CASE.

Witnesses:
K. I. CLEMONS,
H. W. BOWEN.